(12) United States Patent
Brand

(10) Patent No.: US 10,670,503 B2
(45) Date of Patent: Jun. 2, 2020

(54) CONFIGURATION, SYSTEM AND METHOD FOR MONITORING GAS-FILLED CONTAINERS

(71) Applicant: SIEMENS AKTIENGESELLSCHAFT, Munich (DE)

(72) Inventor: Bastiaan Brand, Hilversum (NL)

(73) Assignee: Siemens Aktiengesellschaft, Munich (DE)

( * ) Notice: Subject to any disclaimer, the term of this patent is extended or adjusted under 35 U.S.C. 154(b) by 120 days.

(21) Appl. No.: 15/131,225

(22) Filed: Apr. 18, 2016

(65) Prior Publication Data

US 2016/0305862 A1 Oct. 20, 2016

(30) Foreign Application Priority Data

Apr. 16, 2015 (DE) .......... 10 2015 206 873

(51) Int. Cl.
| | |
|---|---|
| G01N 9/26 | (2006.01) |
| G01D 21/00 | (2006.01) |
| G01N 23/00 | (2006.01) |
| H04B 7/24 | (2006.01) |

(52) U.S. Cl.
CPC .......... G01N 9/266 (2013.01); G01D 21/00 (2013.01); G01N 23/00 (2013.01); H04B 7/24 (2013.01)

(58) Field of Classification Search
CPC ........ G01N 9/266; G01N 23/00; G01D 21/00; H04B 7/24
USPC ....................................... 73/25.05
See application file for complete search history.

(56) References Cited

U.S. PATENT DOCUMENTS

| | | | | |
|---|---|---|---|---|
| 6,239,723 B1 * | 5/2001 | Bauerschmidt | ...... | H02B 13/065 324/126 |
| 6,367,308 B1 | 4/2002 | Marmonier | | |
| 7,123,163 B2 * | 10/2006 | Oosthof | .......... | G01D 5/20 340/870.02 |
| 7,667,594 B2 * | 2/2010 | Funo | ...... | G01K 11/06 340/538.16 |
| 9,239,254 B1 * | 1/2016 | Parvarandeh | .......... | G01D 21/00 |

(Continued)

FOREIGN PATENT DOCUMENTS

| | | |
|---|---|---|
| DE | 9316327 U1 | 11/1994 |
| DE | 19523939 A1 | 1/1997 |

(Continued)

OTHER PUBLICATIONS

Vincent Liu et al., "Ambient Backscatter: Wireless Communication Out of Thin Air", University of Washington, published on SIGCOMM'13, Aug. 12-16, 2013, Hong Kong, China.

(Continued)

*Primary Examiner* — Marrit Eyassu
(74) *Attorney, Agent, or Firm* — Laurence Greenberg; Werner Stemer; Ralph Locher

(57) ABSTRACT

A configuration for monitoring gas-filled containers includes at least one measuring device for measuring at least one parameter of the gas in the container, a communication device which is suitable for transmitting information about the gas to an evaluation device, and an energy supply device which is suitable for acquiring electrical energy from the surrounding electromagnetic radiation. In addition, a system having the configuration and a corresponding method are provided.

9 Claims, 3 Drawing Sheets

(56) References Cited

U.S. PATENT DOCUMENTS

| | | | |
|---|---|---|---|
| 2003/0107483 A1* | 6/2003 | Kano | G01D 1/18 |
| | | | 340/540 |
| 2005/0007239 A1* | 1/2005 | Woodard | B60C 23/0449 |
| | | | 340/10.2 |
| 2005/0008904 A1 | 1/2005 | Suppes | |
| 2009/0040049 A1 | 2/2009 | Delecourt et al. | |
| 2010/0063749 A1* | 3/2010 | Kurtz | G01N 9/266 |
| | | | 702/24 |
| 2010/0145481 A1* | 6/2010 | Philipps | G01D 21/02 |
| | | | 700/32 |

FOREIGN PATENT DOCUMENTS

| | | |
|---|---|---|
| DE | 19703854 A1 | 8/1998 |
| DE | 102007017632 A1 | 10/2008 |
| DE | 2014037396 A1 | 3/2014 |
| EP | 1238246 B1 | 3/2004 |
| JP | 2007170555 A | 7/2007 |
| WO | 9512151 A1 | 5/1995 |
| WO | 2012140310 A1 | 10/2012 |

OTHER PUBLICATIONS

Mikel Choperena, "Battery-Less Wireless Temperature Sensors Based on Low Power UHF RFID tags", Jun. 10, 2013,("http://www.sensorsmag.com/product/development-platform-advances-battery-free-sensors-and").

Farsens—Andy 100 User Guide, "Standalone Software User Guide—UG-Standalonesw-V03", Apr. 2014.

Farsens "EPC C1G2 Compliant Batteryless Sensor/Actuator Development Platform Powered by ANDY100 PB-Medusa-V01", Sep. 2014.

Michael Choperena, "Battery-less wireless temperature sensors based on low power UHF RFID tags", Farsens, Jun. 10, 2013, ("http://www.sensorsmag.com/product/development-plafform-advances-battery-free-sensors-and").

\* cited by examiner

CONFIGURATION, SYSTEM AND METHOD FOR MONITORING GAS-FILLED CONTAINERS

CROSS-REFERENCE TO RELATED APPLICATION

This application claims the priority, under 35 U.S.C. § 119, of German Patent Application DE 10 2015 206 873.0, filed Apr. 16, 2015; the prior application is herewith incorporated by reference in its entirety.

BACKGROUND OF THE INVENTION

Field of the Invention

The invention relates to a configuration, a system and a corresponding method for monitoring gas-filled containers.

Electrical installations such as, for example, high-voltage switching installations are frequently insulated with a protective gas such as, for example, sulfur hexafluoride ($SF_6$). $SF_6$ is, however, damaging to the environment, and the manufacturers and operators of the electrical installations are being required to meet ever stricter regulations to avoid $SF_6$ losses into the atmosphere. Recent guidelines require, for example, that less than 0.5% of the $SF_6$ of an installation be emitted into the environment per year. Furthermore, since 2015 there has been a requirement to monitor the $SF_6$ pressure and the $SF_6$ gas density at least every 6 months and to keep a log of the chronological profile of the $SF_6$ pressure and of the $SF_6$ gas density. Those regulations apply to all installations with more than 22 kg of the protective gas. That includes virtually all high-voltage installations.

At present, analog gas pressure or gas density measuring devices are frequently used to monitor the electrical installations, and those gas pressure or gas density measuring devices have to be mounted on the installation and their readings have to be taken in situ by a technician. If the gas pressure or the gas density drops below previously specified threshold values, an alarm is triggered and/or the electrical installation is switched off directly, in order to avoid faults and damage to the installation. That constitutes a problem for the reliability of an energy distribution grid because the failure of an electrical installation due to losses of protective gas cannot be predicted and either the threshold values are not undershot and the installation remains in operation or the threshold values are undershot and failure or deactivation occurs. For that reason, the logs mentioned at the beginning are required, because those recordings can be used to detect gas losses in the chronological profile, and the need for maintenance of the electrical installation with corresponding restoration of the required protective gas pressure can be anticipated on the basis of the rate of gas loss.

Nevertheless, problems arise even in the case of periodic monitoring, since many relatively old electrical installations currently do not have suitable gas pressure or gas density measuring devices and would have to be expensively retrofitted. Furthermore, technicians cannot always easily reach high-voltage installations and take their readings, which makes monitoring those installations difficult and expensive.

If digital measuring devices and on-line monitoring systems are used, they have to be supplied with low voltage for their energy supply. However, that can often only be made available in a technically complex fashion with a measuring transformer, and is therefore expensive, in particular if old installations are to be retrofitted with modern measuring devices. Furthermore, data processing devices have to be used which evaluate the measurement data in situ and convert, for example, gas pressure values and gas temperature values into gas density values.

By way of addition, the publication "Ambient Backscatter: Wireless Communication Out of Thin Air" by Vincent Liu, et al., University of Washington, published on SIGCOMM '13, Aug. 12-16, 2013, Hong Kong, China is known. In that publication, devices are described which can communicate with one another and at the same time require only surrounding electromagnetic radiation ("ambient radio frequency signals"), such as is used, for example, by television signals, for the energy supply. In that context, a technique called "ambient backscatter" is used in which the surrounding electromagnetic radiation is backscattered in a modified form by a device, in order to transmit information such as, for example, signals of a contact sensor. Since the devices do not generate any suitable electromagnetic radiation, they are particularly economical in terms of energy. A prototype reaches data transmission rates of up to 1 kbps at a distance of up to 2.5 feet between the devices.

Furthermore, the website article "Battery-Less Wireless Temperature Sensors Based On Low Power UHF RFID tags", Jun. 10, 2013 by Mikel Choperena is known ("http://www.sensorsmag.com/product/development-platform-advances-battery-free-sensors-and"), which describes sensors from the firm Farsens. Those sensors use RFID with ultra-high frequency signals (approximately 900 MHz) and measure the temperature, pressure, air humidity, etc. A possible use mentioned is sensors for avoiding fires in electrical switching installations. The data communication range is up to 1.5 m.

A similar system is also described in the operating instructions "STANDALONE SOFTWARE USER GUIDE; UG-STANDALONESW-V03" from Farsens of April 2014. Software is described therein with which sensor data of the sensor "ANDY100" can be processed. Such a sensor is known from the product brochure "EPC C1 G2 COMPLIANT BATTERYLESS SENSOR/ACTUATOR DEVELOPMENT PLATFORM POWERED BY ANDY100 PB-MEDUSA-V01" by Farsens from September 2014.

SUMMARY OF THE INVENTION

It is accordingly an object of the invention to provide a configuration, a system and a method for monitoring gas-filled containers, which overcome the hereinafore-mentioned disadvantages of the heretofore-known configurations, systems and methods of this general type and with which monitoring can be carried out automatically and simply without the need to make available an additional connection to an energy supply grid for supplying energy to the configuration.

With the foregoing and other objects in view there is provided, in accordance with the invention, a configuration for monitoring gas-filled containers, comprising at least one measuring device for measuring at least one parameter of the gas in the container, a communication device which is suitable for transmitting information about the gas to an evaluation device, and an energy supply device which is suitable for acquiring electrical energy from the surrounding electromagnetic radiation.

This is an advantage because costs and expenditure on maintenance for making available a connection to an energy supply grid are avoided. In particular, it is not necessary to generate a voltage which is suitable for the voltage supply of the configuration according to the invention by using a measuring transformer, for example from the high voltage which is at a gas-insulated electrical installation. Possible sources of the electromagnetic radiation are TV signals, radio signals or communication networks such as 3G, 4G, etc. which are available with almost total area coverage in many countries. Electromagnetic radiation near to high-voltage lines can also be used.

In this context it is generally advantageous to use measuring devices with a comparatively low energy demand such as are known, for example, from the RFID sensors from Farsens as mentioned in the introduction.

The information about the gas can include the measured parameters and/or other information, for example if further processing of the measured parameters takes place directly in the configuration.

In one preferred embodiment of the configuration according to the invention, an additional source of electromagnetic radiation is used to generate more electrical energy by using the energy supply device. A WIFI, TV, radio or light source can be used as the additional source. In this context, continuous irradiation can take place or chronologically short radiation pulses can be used. It is an advantage of this additional, cableless energy supply that only one additional source of electromagnetic radiation has to be made available with little expenditure at the place of use, for example a switching installation with a plurality of containers, which source can, where appropriate, be supplied itself by solar energy if no energy supply grid connection is available. The evaluation device can also be configured as an additional source, in which case the device then not only receives measurement data but also emits energy.

In a further preferred embodiment of the configuration according to the invention, the at least one measuring device includes a gas pressure measuring device. This is advantageous because the pressure of the gas in the container permits conclusions to be drawn about the leakproofness of the container.

In a further preferred embodiment of the configuration according to the invention, the at least one measuring device includes a temperature measuring device. This is advantageous because knowledge of the temperature in conjunction with the pressure of the gas in the container permits conclusions to be drawn about the density of the gas.

In a further preferred embodiment of the configuration according to the invention, the communication device is suitable for establishing a radio link to the evaluation device. This is advantageous because radio links can be used simply, cost-effectively and flexibly.

In a further preferred embodiment of the configuration according to the invention, the communication device is suitable for establishing a radio link to adjacent configurations. This is advantageous because in this way a communication network can be formed when there is, for example, a plurality of installations to be monitored. In this context, a single evaluation device can be provided jointly for all, or for some, of the users of the network.

In a further preferred embodiment of the configuration according to the invention, the energy supply device is suitable for using electromagnetic radiation in the radio frequency band and/or in the frequency band for TV signals and/or in the frequency band for mobile radio for the acquisition of energy. This is an advantage because energy supply is secured with virtually total area coverage in the radio frequency band with TV signals and/or radio signals and/or mobile radio such as, for example, 3G or 4G.

In a further preferred embodiment of the configuration according to the invention, the energy supply device is suitable for using light by using solar cells for the acquisition of energy. This is advantageous because the acquisition of energy by using solar cells has been tested and proven for a long time and is reliable.

In a further preferred embodiment of the configuration according to the invention, an energy accumulator is provided for buffering the electrical energy which is generated by the energy supply device. This is an advantage because in this way a significantly higher quantity of energy can be generated with very low continuous generation of energy, and that quantity permits parameters of the gas to be measured periodically once a day for example.

In a further preferred embodiment of the configuration according to the invention, the evaluation device is suitable for calculating the density of the gas from the measured parameters of the gas pressure and temperature. This is advantageous because in this way further processing and evaluation of the measured parameters can take place centrally in the evaluation device, and no separate computing capacity has to be provided in each individual configuration. This saves energy during operation, as a result of which the energy supply device can be given a smaller configuration. Furthermore, costs can be saved. The measured parameters are transmitted to the evaluation device with the communication device.

In a further preferred embodiment of the configuration according to the invention, a computer device is provided which is suitable for calculating the density of the gas from the measured parameters of the gas pressure and temperature. This is advantageous because in this way the measured parameters can be further processed and evaluated locally in the configuration. The calculated gas density is transmitted to the evaluation device with the communication device. This is advantageous because in this way all the required functionality for determining the gas density is provided in the configuration, and the evaluation device merely requires an interface for receiving the gas density.

In a further preferred embodiment of the configuration according to the invention, the at least one measuring device is assigned to a connecting apparatus which is suitable for connecting to a container. This is advantageous because as a result there is no need for an additional opening to be made into an existing container, but instead, for example, a gas filling apparatus of a gas-insulated switching installation can be used to implement automatic monitoring of the gas in the container.

In addition, the invention has the object of making available a system for monitoring gas-filled containers with which monitoring can be carried out automatically and simply without an additional connection to an energy supply grid for supplying energy to the configuration having to be made available.

With the objects of the invention in view, there is also provided a system for monitoring gas-filled containers, the system comprising a configuration according to the invention and a gas-filled container.

According to the invention, the container may be an electrical installation being filled with a protective gas. The protective gas may include sulfur hexafluoride. The configuration may be configured for retrofitting a container to its existing gas filling apparatus. In this context, the same advantages as described at the beginning for the configuration according to the invention arise correspondingly for the system according to the invention and its embodiments.

In addition, the invention has the object of making available a method for monitoring gas-filled containers with which monitoring can be carried out automatically and simply without an additional connection to an energy supply grid for supplying energy to the configuration having to be made available.

With the objects of the invention in view, there is concomitantly provided a method for monitoring gas-filled containers, comprising acquiring electrical energy from electromagnetic radiation surrounding a gas-filled container for supplying energy to at least one measuring device and one communication device, using the at least one measuring device to measure at least one parameter of the gas in the container, and using the communication device to transmit information about the gas to an evaluation device.

According to a preferred and advantageous embodiment, the method further includes using the at least one measuring device to measure pressure and temperature parameters of the gas, and calculating a density of the gas from the measured parameters. In this context, the method according to the invention and its embodiments correspondingly result in the same respective advantages as described for the configuration according to the invention in the introduction.

Other features which are considered as characteristic for the invention are set forth in the appended claims.

Although the invention is illustrated and described herein as embodied in a configuration, a system and a method for monitoring gas-filled containers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
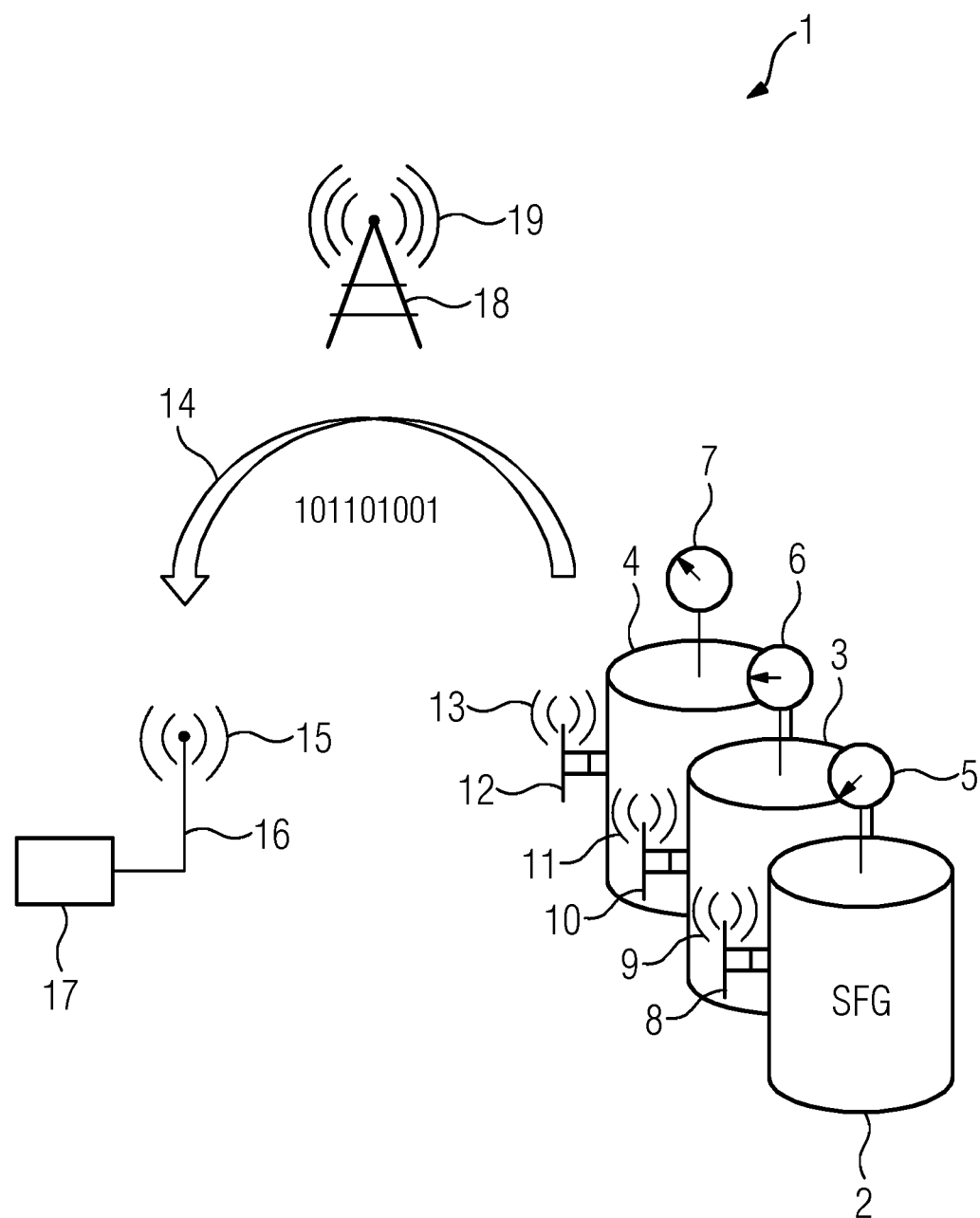
FIG. 1 is a diagrammatic, perspective view illustrating an application example of the system according to the invention.

Referring now to the figures of the drawings in detail and first, particularly, to FIG. 1 thereof, there is seen a diagrammatic illustration of a switching installation 1. Three containers 2, 3, 4, which in this case are gas-insulated, high-voltage switching installations that are filled with the protective gas $SF_6$, each have an analog measuring device 5, 6, 7 which indicates the gas density. In this context the arrows in the measuring devices 5, 6, 7 indicate the display of the gas density on an analog scale.

Each of the containers 2, 3, 4 has, on its gas filling device, a configuration 8, 10, 12 according to the invention which utilizes the surrounding electromagnetic radiation 19 of a radiation source 18, which is a TV transmission mast or tower, for acquiring energy.

The configurations 8, 10, 12 transmit the measured parameters of the gas, in this case the temperature and the gas pressure, to an evaluation device 17 over radio links 9, 11, 13 such as, for example, W-LAN. The digital transmission of the data is indicated by an arrow 14 and a signal 101101001.

The evaluation device 17 has an antenna 16 for receiving and/or transmitting radio signals 15 and is configured to calculate the density of the gas from the measured parameters of the gas pressure and temperature. Therefore, the rate at which gas loss occurs within the container can be determined precisely by using the chronological profile of a plurality of measurements. In addition to the radiation source 18 or even instead of the radiation source 18, the evaluation device 17 can, by using its transmission function, make available electromagnetic radiation for the energy supply of the energy supply devices of the configurations.

The evaluation device 17 in this example is disposed close to the individual containers, but it could also be disposed at any desired location throughout the world given corresponding wider-ranging communication devices such as, for example, an Internet link.

It is an advantage of the system according to the invention that a power supply or an energy grid connection for the configurations 8, 10, 12 does not have to be specially configured on any of the containers.

Instead, an existing container can be retrofitted with the configuration 8, 10, 12 according to the invention on its gas filling device which is usually already present.

Figure 2:
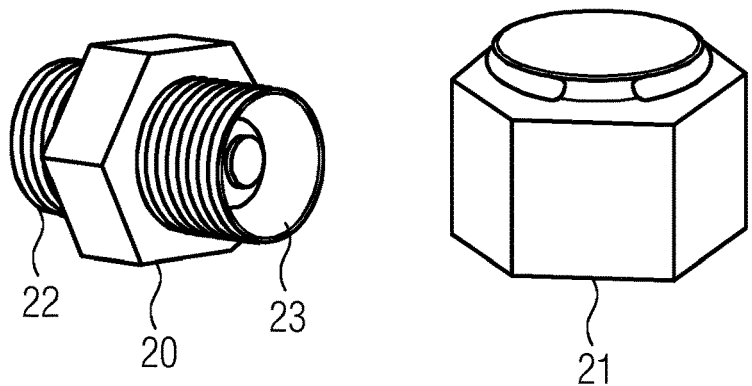
FIG. 2 is a perspective view of a known closure device for a gas filling device for a container.

FIG. 2 shows a known closure device 21 for a gas filling device 20 of a container, wherein the gas filling device 20 has a rear side 22 and a front side 23 with a valve. If the configuration according to the invention is to be used instead of the closure device 21 shown in order to retrofit an existing container, the configuration according to the invention must be suitable for use with the gas filling device 20.

Figure 3:
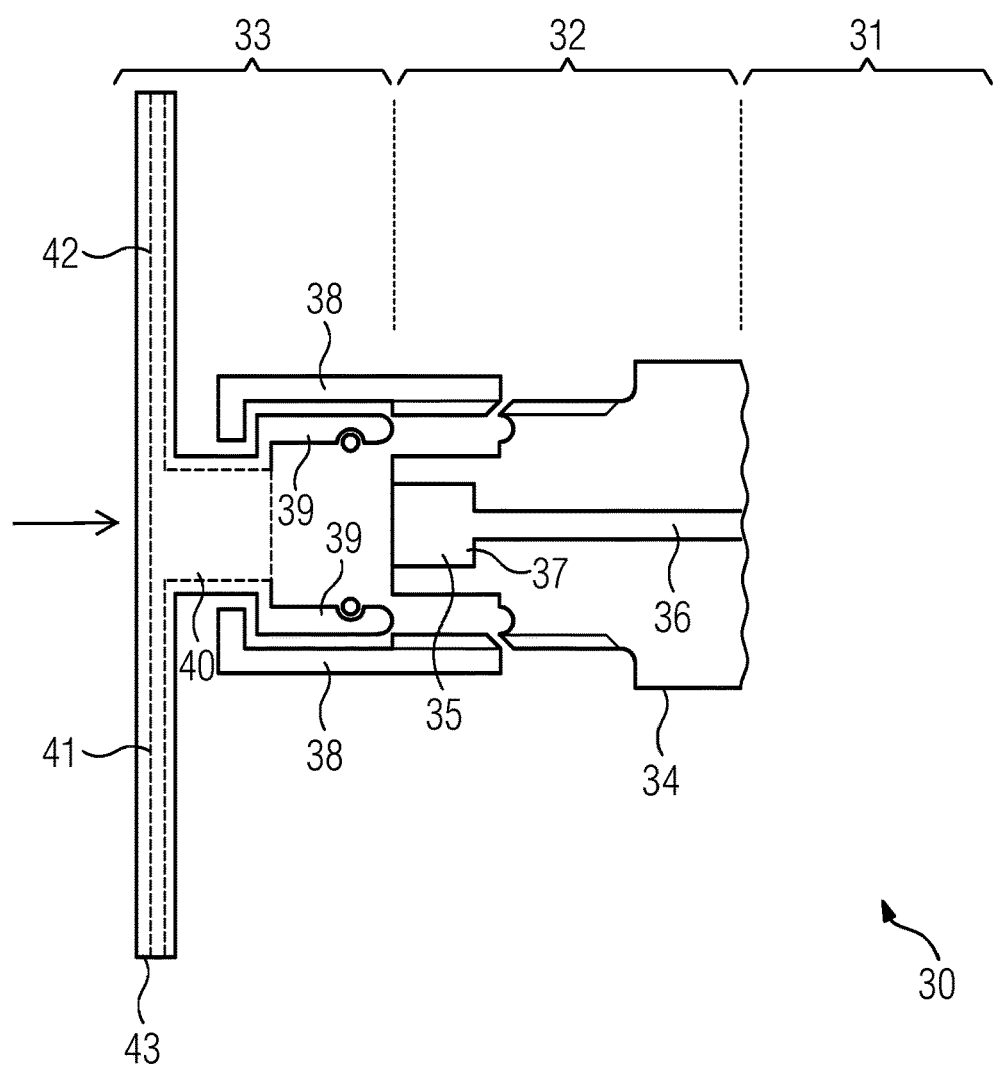
FIG. 3 is a longitudinal-sectional view of an exemplary embodiment of a system according to the invention.

FIG. 3 is a diagrammatic illustration of an exemplary embodiment of a system 30 according to the invention. A container which is filled with the protective gas $SF_6$ is located in a region 31.

A customary gas filling device 20 is attached to the container in a region 32. The gas filling device 20 has a base 34 with a recess 35 in which a chamber 37 and a through-opening 36 are located. The chamber 37 and through-opening 36 form a fluid-conducting connection to the container and therefore contain the gas. The chamber is open toward the left-hand side.

A configuration according to the invention, which is shown in a region 33, has not yet been completely fitted (in the direction of an arrow) onto the gas filling device 20 for the sake of better clarity. The configuration has a sleeve 38 and a bushing 39 with sealing devices (indicated by circles). A central part 40 is located at a base of the bushing 39.

If the configuration is completely fitted onto the gas filling device 20, the sleeve 38 engages around the left-hand part of the base 34, and the bushing 39 encloses the recess 35, with the result that the chamber 37 bears against the central part 40. In this way, the gas $SF_6$ is present at the central part of the configuration during the operation of the system.

The central part 40 of the configuration has a gas pressure measuring device and a temperature measuring device with which the gas pressure and temperature of the $SF_6$ can be determined.

In one development of the configuration, a computer device for controlling the configuration and processing the measured parameters, as well as an energy accumulator, can additionally be provided in the central part.

The central part 40 is adjoined by an outer part 43 which, on one hand, has an energy supply device 41 that is suitable for acquiring electrical energy from the surrounding electromagnetic radiation. On the other hand, the outer part 43 has a communication device 42 which is suitable for transmitting the measured parameters to an evaluation device.

Figure 4:
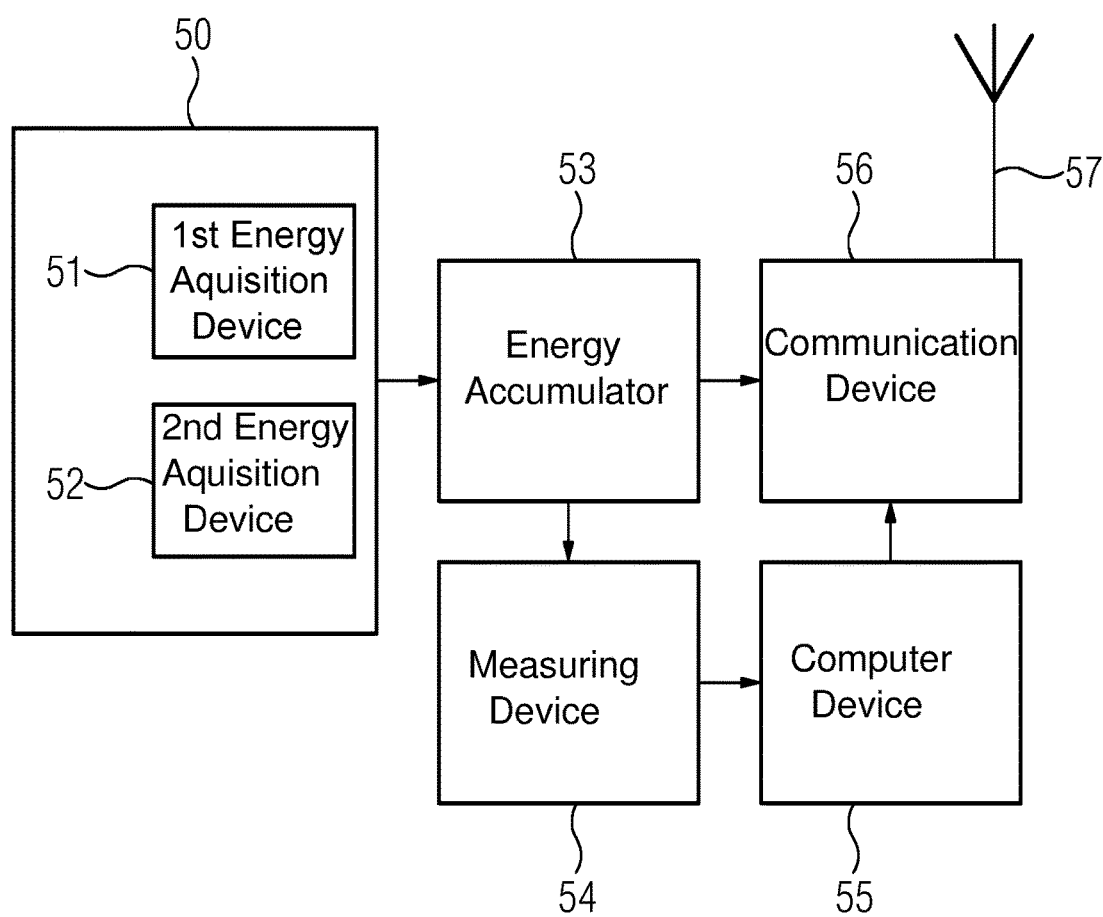
FIG. 4 is a block diagram of an exemplary embodiment of a configuration according to the invention.

FIG. 4 shows an exemplary embodiment of a configuration according to the invention with an energy supply device 50 which is suitable for acquiring electrical energy from the surrounding electromagnetic radiation. In this context, a first energy acquisition device 51 is used to acquire electrical energy from surrounding radio waves such as, for example, TV signals and/or radio signals and/or a second energy acquisition device 52 is used to acquire electrical energy from light.

The acquired electrical energy is buffered in an energy accumulator 53 and used when necessary, for example periodically once per day, in order to determine the gas pressure and temperature by using a measuring device 54 and to transmit these to a computer device 55. The computer device 55 processes the measured parameters and can calculate the density of the protective gas in the container from the gas pressure and the temperature by using a calculation rule which is adapted to the protective gas $SF_6$.

Finally, the calculated density value and, if appropriate, the measured parameters are transmitted by radio through a communication device 56 with an antenna 57 for further processing. In this context, the communication device 56 is also supplied by the energy accumulator 53.

The invention claimed is:

1. A system for monitoring gas-filled containers, the system comprising:
   an existing gas-filling device having a chamber to be filled with a gas; and
   a configuration retrofitted onto said gas-filling device for allowing the gas to pass through said configuration, said configuration including:
      a central part disposed at said chamber;
      at least one measuring device disposed in said central part for measuring at least one parameter of the gas in the container, said at least one measuring device including a gas pressure measuring device measuring gas pressure and a temperature measuring device measuring temperature parameters;
      an evaluation device being configured to calculate a density of the gas from the measured parameters of the gas pressure and temperature;
      a communication device configured to transmit information about the gas to said evaluation device; and
      an energy supply device configured to acquire electrical energy from surrounding electromagnetic radiation, said energy supply device being configured to operate without an additional external source of energy except for electromagnetic radiation in at least one of the radio frequency band or the frequency band for TV signals or the frequency band for mobile radio for the acquisition of energy.

2. The system according to claim 1, wherein said communication device is configured to establish a radio link to said evaluation device.

3. The system according to claim 1, wherein said energy supply device is configured to use light and solar cells for the acquisition of energy.

4. The system according to claim 1, which further comprises an energy accumulator for buffering electrical energy generated by said energy supply device.

5. The system according to claim 1, which further comprises a connecting apparatus configured to connect to a container, said at least one measuring device being associated with said connecting apparatus.

6. The system according to claim 1, wherein said container is an electrical installation being filled with a protective gas.

7. The system according to claim 6, wherein said protective gas includes sulfur hexafluoride.

8. The system according to claim 1, wherein said configuration is configured for retrofitting a container to its existing gas filling apparatus.

9. A method for monitoring gas-filled containers, the method comprising the following steps:
   providing an existing gas-filling device having a chamber to be filled with a gas;
   retrofitting a configuration onto the gas-filling device for allowing the gas to pass through the configuration, the configuration having a central part disposed at the chamber; and
   operating the configuration by:
      acquiring electrical energy from electromagnetic radiation surrounding the gas-filled container for supplying energy to at least one measuring device disposed in said central part and one communication device without using an additional external source of energy;
      using the at least one measuring device to measure at least one parameter including pressure and temperature of the gas in the container;
      using the communication device to transmit information about the gas to an evaluation device; and
      calculating a density of the gas from the measured parameters.

* * * * *